US008347046B2

(12) United States Patent
Panabaker et al.

(10) Patent No.: US 8,347,046 B2
(45) Date of Patent: Jan. 1, 2013

(54) POLICY FRAMEWORK TO TREAT DATA

(75) Inventors: Ruston Panabaker, Redmond, WA (US); James R. Hamilton, Bellevue, WA (US); William J. Westerinen, Sammamish, WA (US); Yadhu N. Gopalan, Redmond, WA (US); Mark A. Myers, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 12/103,309

(22) Filed: Apr. 15, 2008

(65) Prior Publication Data
US 2009/0259795 A1 Oct. 15, 2009

(51) Int. Cl.
*G06F 12/00* (2006.01)

(52) U.S. Cl. ........................................ 711/154; 711/103

(58) Field of Classification Search .................. 711/154, 711/103
See application file for complete search history.

(56) References Cited

U.S. PATENT DOCUMENTS

| | | | |
|---|---|---|---|
| 5,905,993 A | 5/1999 | Shinohara | |
| 6,417,844 B1 | 7/2002 | Kodama | |
| 6,654,855 B1 * | 11/2003 | Bopardikar et al. | 711/133 |
| 6,754,765 B1 | 6/2004 | Chang et al. | |
| 6,904,493 B2 | 6/2005 | Chiao et al. | |
| 7,080,232 B2 | 7/2006 | Aasheim et al. | |
| 2005/0065961 A1 * | 3/2005 | Aguren | 707/102 |
| 2005/0120175 A1 * | 6/2005 | Shimada et al. | 711/114 |
| 2005/0132129 A1 | 6/2005 | Venkiteswaran | |
| 2006/0020745 A1 | 1/2006 | Conley et al. | |
| 2006/0101284 A1 | 5/2006 | Feuser et al. | |
| 2006/0236055 A1 * | 10/2006 | Iitsuka | 711/165 |
| 2006/0271758 A1 * | 11/2006 | Innan et al. | 711/170 |
| 2007/0016750 A1 * | 1/2007 | Suzuki | 711/170 |
| 2007/0136509 A1 | 6/2007 | Agami | |
| 2009/0172333 A1 * | 7/2009 | Marcu et al. | 711/165 |
| 2009/0249014 A1 * | 10/2009 | Obereiner et al. | 711/164 |

OTHER PUBLICATIONS

Eran Gal, et al. Mapping Structures for Flash Memories: Techniques and Open Problems http://www.cs.tau.ac.il/~stoledo/Pubs/swste2005.pdf. Last accessed Oct. 29, 2007, 10 pages.

Junkil Ryu, et al. Fast Initialization and Memory Management Techniques for Log-Based Flash Memory File Systems http://www.springerlink.com/content/x3061p516061h006/. Last accessed Oct. 29, 2007, 2 pages.

AN002—eCOG1k External Flash Memory, version 1.7, Mar. 13, 2006. http://www.cyantechnology.com/public/AN002eCOG1ExternalFlashMemory.pdf. Last accessed Oct. 29, 2007, 28 pages.

\* cited by examiner

*Primary Examiner* — Hashem Farrokh

(74) *Attorney, Agent, or Firm* — Lee & Hayes, PLLC

(57) ABSTRACT

Data can be retained upon a storage medium that has characteristics suitable for the data. However, as the storage mediums are used, time passes, etc., characteristics of memory can change and therefore data can reside upon an improper medium. Data can be dynamically moved from one storage location to another automatically and intelligently based upon a change in characteristics. In addition, new data can be placed on a storage medium based upon characteristics of the medium in a current state.

21 Claims, 10 Drawing Sheets

POLICY FRAMEWORK TO TREAT DATA

TECHNICAL FIELD

The subject specification relates generally to data storage and in particular to dynamically moving information based on storage characteristics.

BACKGROUND

Many personal electronic devices, such as laptop computers, cellular telephones, personal digital assistants, and the like use memory to retain information ranging from an operating system to photographs. A user can select a specific location for storage and the device can place the data in the selected location. For instance, a command can be instructed by the user that a master version of a document be retained upon a local storage unit while a copy of the master version is retained upon a shared location.

Various methods can be used to place information in a particular location. For example, a user can employ a graphical user interface to transfer data from one storage location to another. Additionally, a user can type text commands that instruct the device where to retain data. Configurations that are more complex can also be employed, such as in a network setting where an administrator decides particular locations that should store information. The administrator can make periodic adjustments to where data is retains based upon various considerations.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

While conventionally a user directs memory content to a particular location, the disclosed innovation allows data to be moved automatically, intelligently, and/or dynamically to improve performance and usage. Since characteristics of storage locations can change due to a large array of factors, information can be placed in an appropriate location in accordance with storage characteristics. Movement of information can include both newly saved information as well as rearrangement of existing saves.

According to one embodiment, an instruction can be collected to retain data. A selection can be made as to what device should retain the data, the selection is commonly made as a function of memory device performance, financial cost, wear, load, power consumption, historical usage, data importance, at least one association, or a combination thereof. Different information can be moved among storage mediums to improve overall performance as well as to accommodate a selection. If a change takes place upon a storage medium, then analysis of the medium can occur to determine suitability of the storage medium to retain particular information or receive additional applicable content and/or data.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
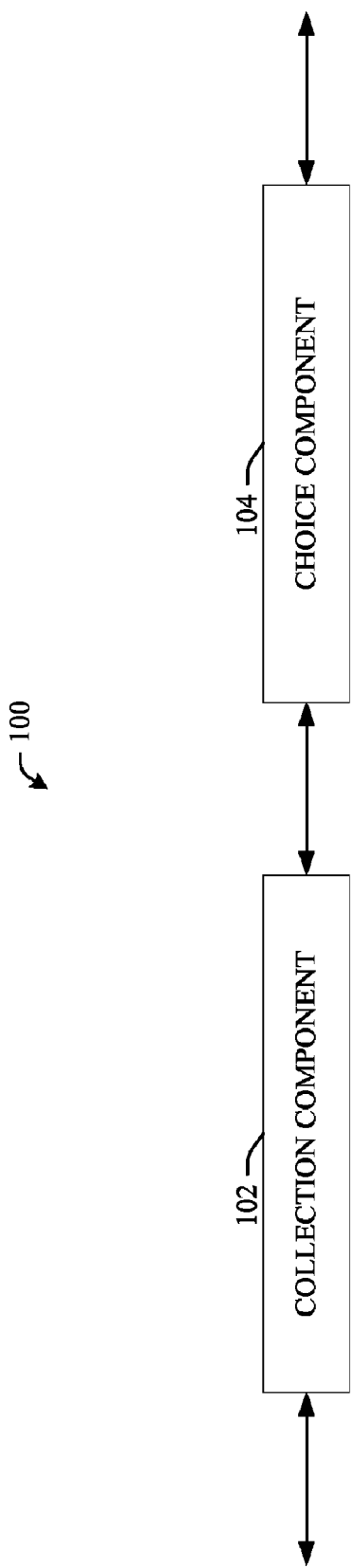
FIG. 1 illustrates a representative system for intelligently choosing a storage location for data retention in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers or computing devices. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN) or transmitting information across a bus (e.g., 1394, seriel, parallel, etc.). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

Now referring to FIG. 1, an example system 100 is disclosed for placing data on an appropriate storage device, oftentimes optimizing operation of multiple storage devices. A computer system can have several different memory devices—a memory device that has relatively fast read times and a second memory device that has slower read times. Different applications can desire to place information upon the faster of the memory devices. As the faster device becomes more loaded, performance can diminish, even to a point where the read time of the chosen memory device becomes slower than the read time of the second or subsequent memory device(s). With the disclosed innovation, information can be intelligently placed upon an appropriate memory device and/or moved among memory devices to improve performance. Commonly, movement and/or placement are performed automatically to improve memory device performance, balance data characteristics, and the like. For example, data can be arranged such that a primary memory device always has faster read times then a secondary or subsequent memory device(s).

An instruction to retain data can be obtained by a collection component 102, where retention of data can include saving new data, moving already saved data, and the like. When new information enters the system 100, an automatic instruction can be generated to store the information in an improved and/or most efficient and optimized manner for the system 100. If the information is considered important, then the information can be placed on secure memory, such as encrypted memory, high performance memory, and the like to improve performance. Additionally, data can be automatically moved due to a change in characteristics. For example, if particular data is accessed frequently, then the data can move to an improved storage device and other data can transfer to other devices accordingly.

A choice component 104 can intelligently select a memory device to retain data from a group of at least two memory devices. A balance can be struck between devices and data so a system operates at an improved or optimal capacity. For example, analysis can be performed on both data as well as storage locations to determine proper placement. Selection can be made as a function of memory device performance (e.g., speed), financial cost (e.g., expense of memory, value of data, etc.), wear (e.g., estimated programming cycles until critical failure), load (e.g., amount of memory stored upon a device), power consumption (e.g., energy used), historical usage (e.g., previous access of data), data importance (e.g., estimated damage if data is lost), at least one association (e.g., other entities such as applications that relay upon the data), or a combination thereof, as well as other criterion.

According to one embodiment, at least two memory devices of the group of at least two memory devices are of different memory types, such as flash memory, random access memory, and the like. Additionally, it is possible that at least two memory devices of the group of at least two memory devices are of different memory formats. An example of different formats can be one memory device is single-level cell flash memory while another memory device can be multi-level cell flash memory. Moreover, at least two memory devices of the group of at least two memory devices reside at different physical locations, such as one device being local while another device is remote and/or devices can be part of a network in different locations.

Figure 2:
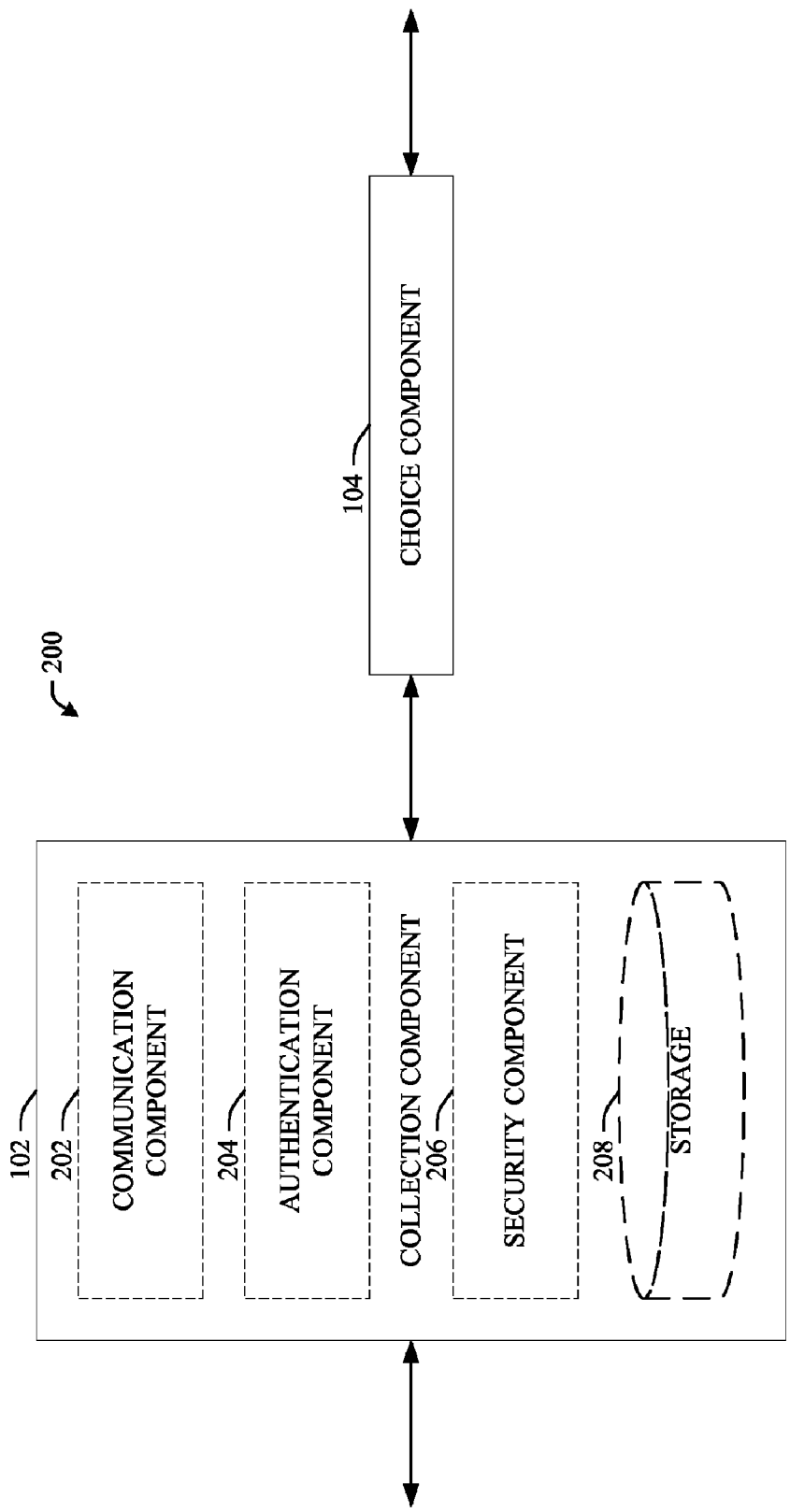
FIG. 2 illustrates a representative system for intelligently choosing a storage location for data retention with a detailed collection component in accordance with an aspect of the subject specification.

Now referring to FIG. 2, an example system 200 is disclosed for placing data on an appropriate storage device with an example detailed collection component 102. The collection component 102 can be employed to gather an instruction to retain data as well as to gain metadata related to the data, storage devices, and the like. To facilitate operation, the collection component 102 can use a communication component 202 that can use standard, proprietary protocols, communication channels, etc. as well as engage with other devices to transfer information, such as obtaining a command, sending a request for metadata, receiving metadata from an auxiliary source, etc. Operation can take place wirelessly, in a hard-wired manner, employment of security technology (e.g., encryption), etc. Additionally, metadata transfer can be active (e.g., query/response) or passive (e.g., monitoring of public communication signals). Moreover, the communication component 202 can use various protective features, such as performing a virus scan on collected metadata and blocking metadata that is positive for a virus.

A check can be performed by an authentication component 204 on if a request to retain data should occur. For example, a company can have a memory configuration that is exclusively accessible to information technology workers for retaining copies of secret information. If an unauthorized user makes a request to save data upon or to that memory configuration, the authentication component 204 can check credentials and deny the request. Additionally, the authentication component 204 can generate a report and/or log of the unauthorized request and transfer the report to a network administrator.

In addition to checking validity of a requester, specific validity of a request can also be verified. A security component 206 can determine if a command should occur based upon the contents of the command through use of standard, proprietary protocols, communication channels, etc. For example, if a request is made to retain malicious content, then the security component 206 can identify potential damage and deny the request.

Different pieces of information, such as collected metadata, component operating instructions (e.g., communication component 202), source location, components themselves, etc. can be held on storage 208. Storage 208 can arrange in a number of different configurations, including as random access memory, battery-backed memory, hard disk, magnetic tape, flash, etc. Various features can be implemented upon storage 208, such as compression and automatic back up (e.g., use of a Redundant Array of Independent Drives configuration). In addition, storage 208 can operate as memory that can be operatively coupled to a processor (not shown). The system 200 can include a choice component 104 that intelligently (and sometimes automatically) selects a memory device to retain the data from a group of at least two memory devices.

Figure 3:
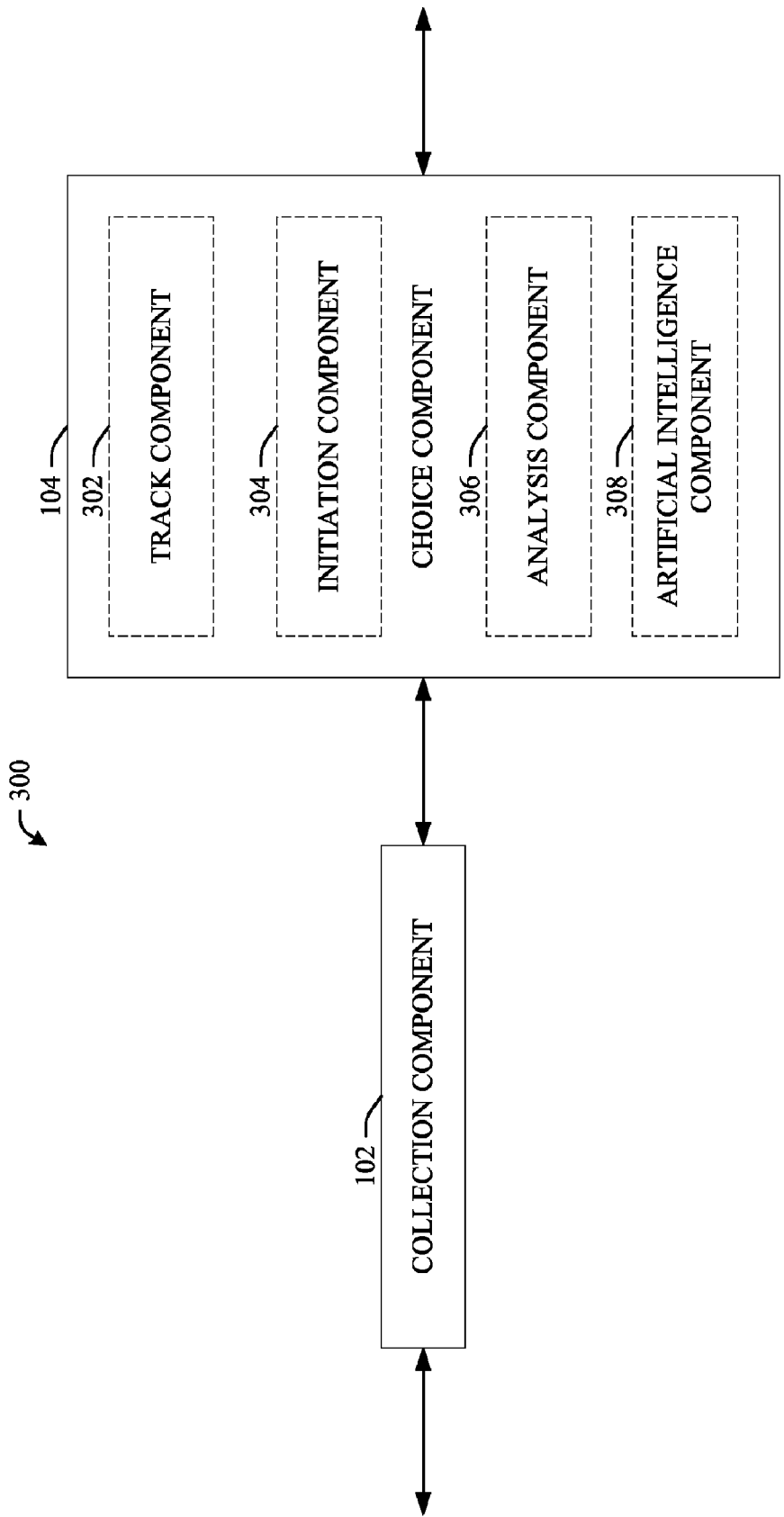
FIG. 3 illustrates a representative system for intelligently choosing a storage location for data retention with a detailed choice component in accordance with an aspect of the subject specification.

Now referring to FIG. 3, an example system 300 is disclosed for placing data on an appropriate storage device with an example detailed choice component 104. A collection component 102 can obtain an instruction to retain data. With an obtained command, a choice component 104 can intelligently select a memory device to retain the data from a group of at least two memory devices.

A track component 302 can collect information on memory devices, such as characteristics of the devices, history of the devices, and so forth. According to one embodiment, the track component 302 can monitor operation of a memory device that is part of the group of at least two memory devices. However, it is possible that the memory devices supply information and thus the track component 302 can gather data that pertains to operation of a memory device that is part of the group of at least two memory devices. Moreover, the track component 302 can make an assumption on operation of a memory device that is part of the group of at least two memory devices. For instance, production of multiple error messages can lead to an assumption (e.g., derived from an inference) that a memory device is in failure or starting to fail. The track component 302 can use the aforementioned techniques as well as other techniques singularly, in partial combination, or complete combination. Oftentimes, a result of employment of the track component 302 is used to select the memory device.

Based upon a result of the track component 302, an initiation component 304 can automatically generate the instruction to retain data as a function of employment of the track component 302. For example, if the track component 302 observes a relatively large numbers of reads on a particular piece of data, then an instruction can be generated to move the piece of data to a higher performance and more efficient and reliable memory type. The initiation component 304 can transfer a request to the collection component 102 for processing.

Metadata collected that relates to the data and/or potential storage devices can be processed by and analysis component 306, where a result of the analysis can be used in selecting a storage device. According to one embodiment, the analysis component 306 evaluates the content of the data; content of the data is used to select the memory device. For example, the data can be an important schematic file—a determination can be made the schematic file should be retained on highly-secure data and the choice component 104 can select an appropriate device.

An artificial intelligence component 308 can make at least one inference or at least one determination in relation to instruction obtainment or memory device selection, commonly through employing a result of operation of the analysis component 306. The artificial intelligence component 308 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 206 can also include methods for capture of logical relationships such as theorem provers or more heuristic rule-based expert systems. The artificial intelligence component 308 can be represented as an externally pluggable component, in some cases designed by a disparate (third) party. The artificial intelligence component 308 can be updated based on learning techniques as well as a list of descriptors for the memory device types and capabilities themselves. Updates to memory capabilities can be updated to various components disclosed herein to improve operation.

Figure 4:
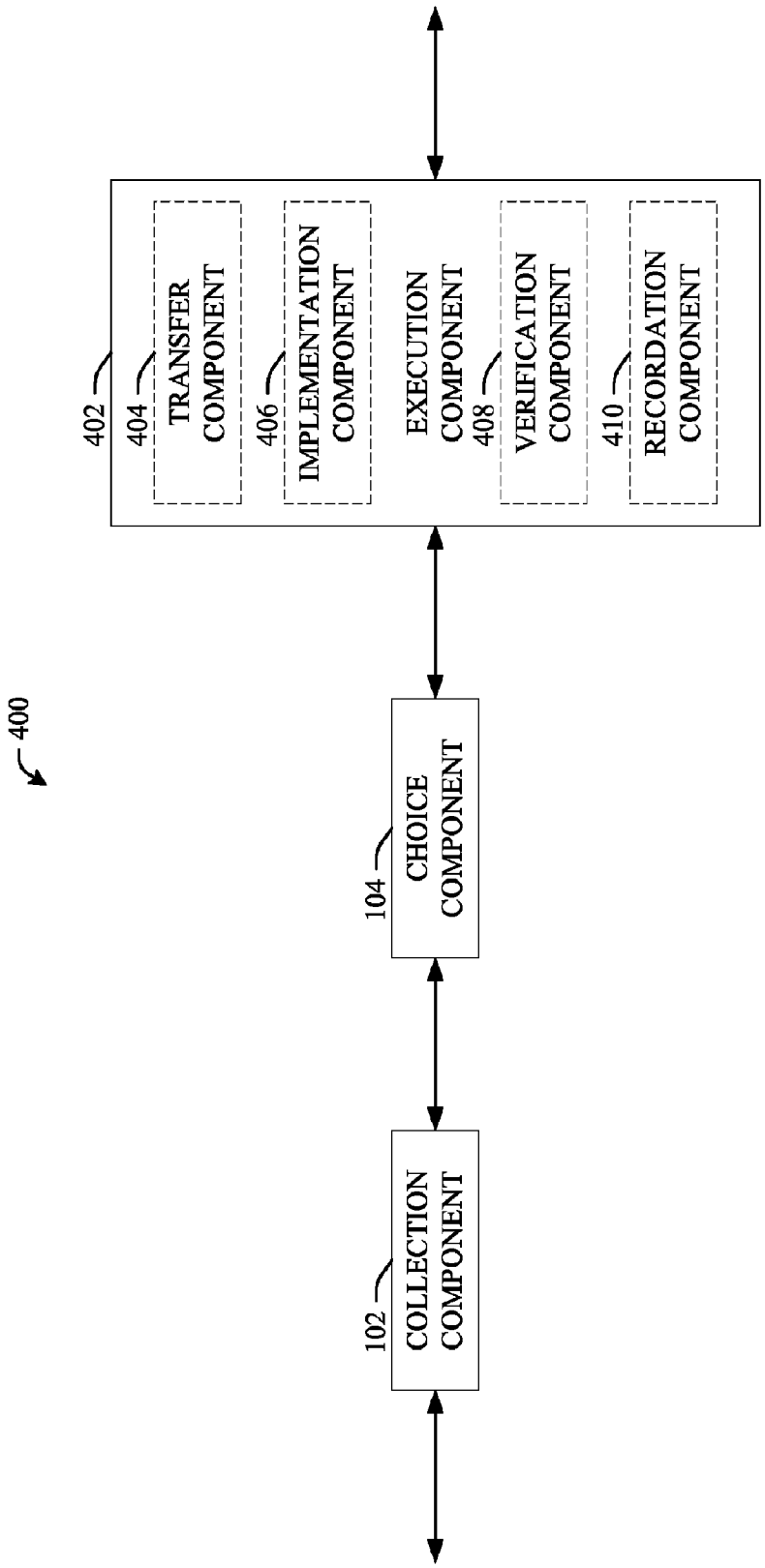
FIG. 4 illustrates a representative system for intelligently choosing a storage location for data storage and retention with a detailed execution component in accordance with an aspect of the subject specification.

Now referring to FIG. 4, an example system 400 is disclosed that allows for a selection of a storage device to be executed though use of an example detailed execution component 402. A collection component 102 can gather an instruction to retain data as well as metadata related to the instruction, such as the type of data to be saved, other information retained upon a potential storage device, and the like. A choice component 104 can intelligently select a memory device to retain the data from a group of at least two memory devices. An execution component 402 can test and implement the selection.

A transfer component 404 can move previously saved information from a previous memory device to a subsequent memory device. The previously saved information can be the data that is designated for retention as well as the previously saved information can be separate from the data that moves to facilitate retention of the data. For example, a request can be made to retain a large amount of new information on a high performance memory. The transfer component 404 can move data stored upon the high performance memory to a lesser memory to make room for the new information.

The memory device(s) can, commonly via standard or private protocols and channels, communicate with the analysis component 306 of FIG. 3 and/or artificial intelligence component 308 of FIG. 3 to ensure the memory device(s) is aware of a recent change (e.g., most recent change) or updates to the memory. The device(s) can function to communicate their recent and overall capabilities in 'real time' to the analysis component 306 of FIG. 3 and/or the artificial intellgence component 308 if FIG. 3 and thus to the choice component 104. The transfer component can test reliability of information retained by the choice component 104 to ensure that capabilities are updated, reliable, relevant, and the like. An implementation component 406 can retain information upon a designated memory device.

Checks upon moved and/or newly retained data can be performed by a verification component 408. Oftentimes, selection and placement of data upon storage devices is based upon predictions made through artificial intelligence techniques. Therefore, it is possible that actual implementation of the selection does not produce a desired result. The verification component 408 can test the implementation and determine if desired results are achieved. If desired results are not achieved, then a supplemental determination can be made if modification should occur and re-operation of disclosed components can take place in accordance with at least one observation made through operation of the verification component 408. A recordation component 410 can log where data is retained as well as metadata related to system 400, such as how many writes a storage device endures.

Figure 5:
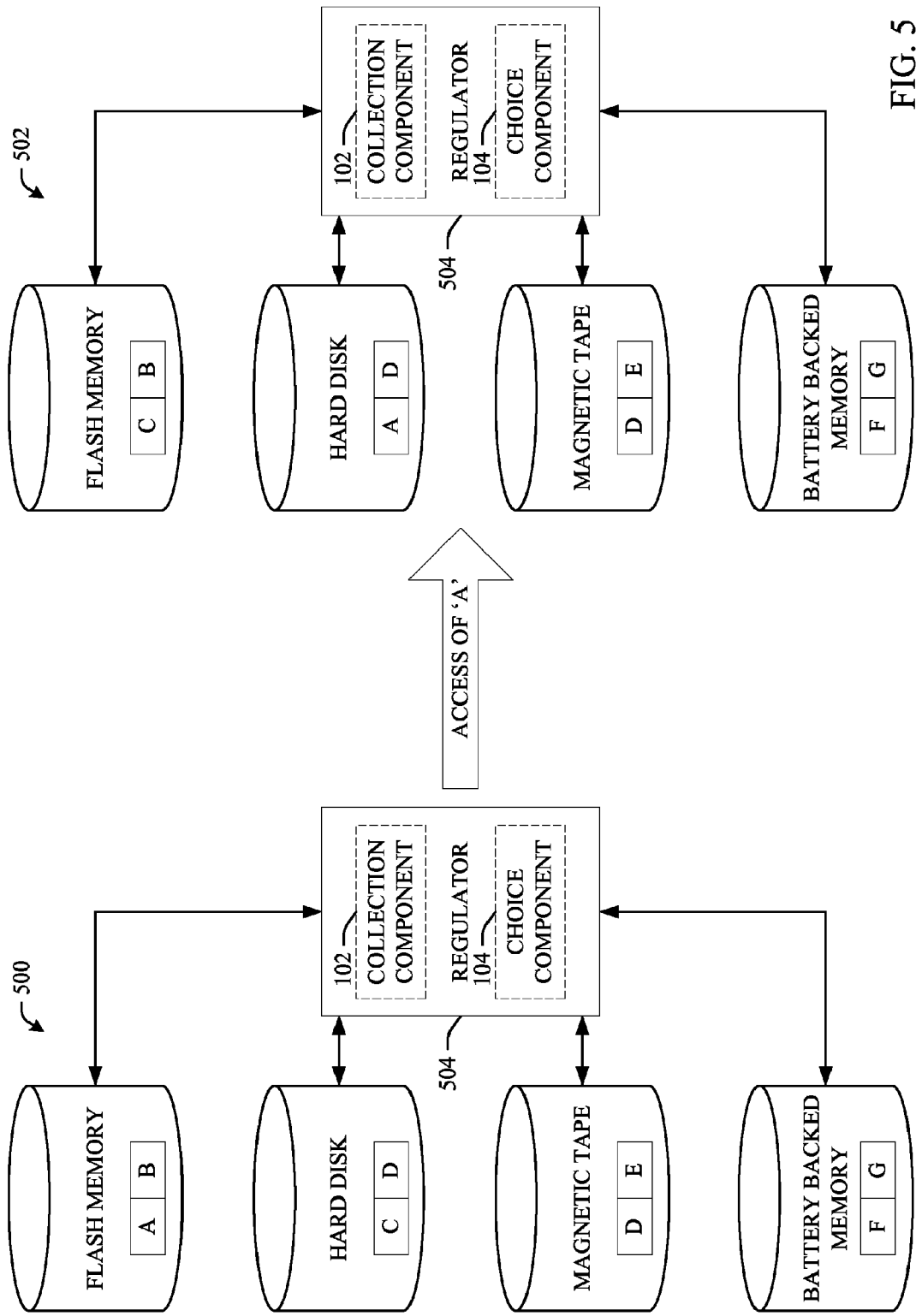
FIG. 5 illustrates a representative transfer of information through use of a collection component and a choice component in accordance with an aspect of the subject specification.

Now referring to FIG. 5, disclosed are two configurations: a first configuration 500 as well as a second configuration 502. Each configuration can retain different memory types, including flash memory, hard disk, magnetic tape, and battery backed memory. While specific memory types are shown, it is to be appreciated that different types and/or formats can be used. The different mediums can retain different data portions A through H as disclosed. Each of the mediums can be accessed by a regulator 504 that can include the collection component 102 and the choice component 104.

A user of an auxiliary program can access data portion A, such that data portion A is extracted, read, and re-programmed without change. The regulator 504 can interrupt the re-programming and determine that the flash memory has been subjected to a relatively large number of programming cycles. Therefore, a determination can be made that since data portion A appears to be a high volume unit, that data packet A should be placed on a less delicate, more reliable type of memory. The choice component 104 can perform detailed analysis to determine a proper location for data portion A, if other data portions should be moved and if so to where, and the like. Based upon the analysis, selection can be made and the selection can be implemented. As shown, data portion C moves to the flash memory while data portion A is retained upon hard disk.

Figure 6:
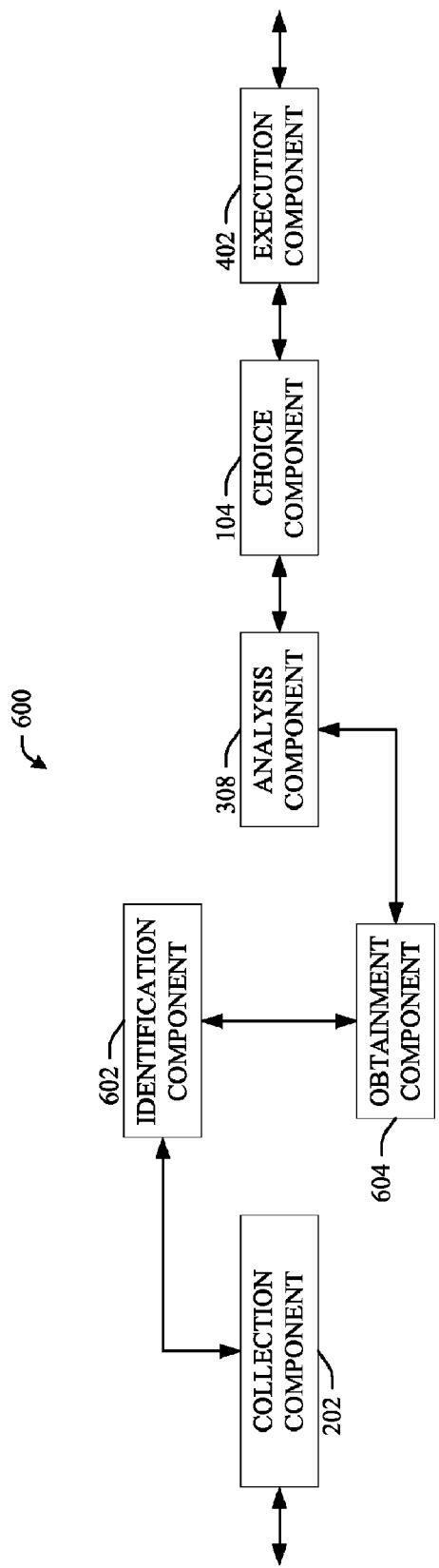
FIG. 6 illustrates a representative system for positioning data in accordance with an aspect of the subject specification.

Now referring to FIG. 6, an example system 600 is disclosed for automatically, intelligently, and/or dynamically placing data upon a suitable storage device, oftentimes to optimize performance related to the data and/or related electronic system. A collection component 102 can interact with various devices in order to share information as well as include other functionality described herein. The collection component 102 can function as means for gathering an instruction to store information within a specified construct (e.g., a computer, a network, etc.).

For example, the collection component 202 can receive a request to save a file within a secure network. An identification component 602 can locate various potential storage units that are part of the construct that can retain the file. The identification component 602 can use a search component to locate potential sources as well as retain a log of suitable locations. The identification component 602 can implement as means for identifying at least two memory units within a construct capable of retaining the data associated with the command.

An obtainment component 604 can collect information that pertains to suitable locations located by the identification component 602. For instance, the obtainment component 604 can gather location characteristics, history, load, likelihood of security breech, and the like. While the obtainment component 604 can gather virtually any form and/or classification of metadata, it is to be appreciated that selective collection can occur. Based upon previous actions, inferences drawn, contextual circumstances, and the like, metadata can be gathered based upon a specific situation. The obtainment component 604 can operate as means for obtaining metadata concerning at least two of the identified memory units. Data types can convey specific tags or metadata in their file stream indicating type of data that is obtained as well as requirements for storage —this information can be used in determining where information should be retained.

An analysis component 308 can evaluate at least a portion of the obtained metadata. Since a large amount of metadata can be collected, the analysis component 308 can function such that metadata estimated to be of high importance can be evaluated first. The analysis component 308 can implement as means for analyzing at least a portion of the collected metadata as a function of at least two of the identified memory units suitability to retain the data.

Evaluation can consume a relatively large amount of resources and therefore once enough metadata is evaluated to make a reasonable selection, the choice component can instruct the analysis component 308 to stop evaluation and/or the obtainment component 604 to stop collecting metadata. The choice component 104 can operate as means for automatically and intelligently selecting one of the identified memory units for retaining the data as a function of a result of the analysis. An execution component 402 can transfer data portions in accordance with a selection made by the choice component 104. The execution component 402 can function as means for implementing the selection by storing the data upon the selected memory unit.

Figure 7:
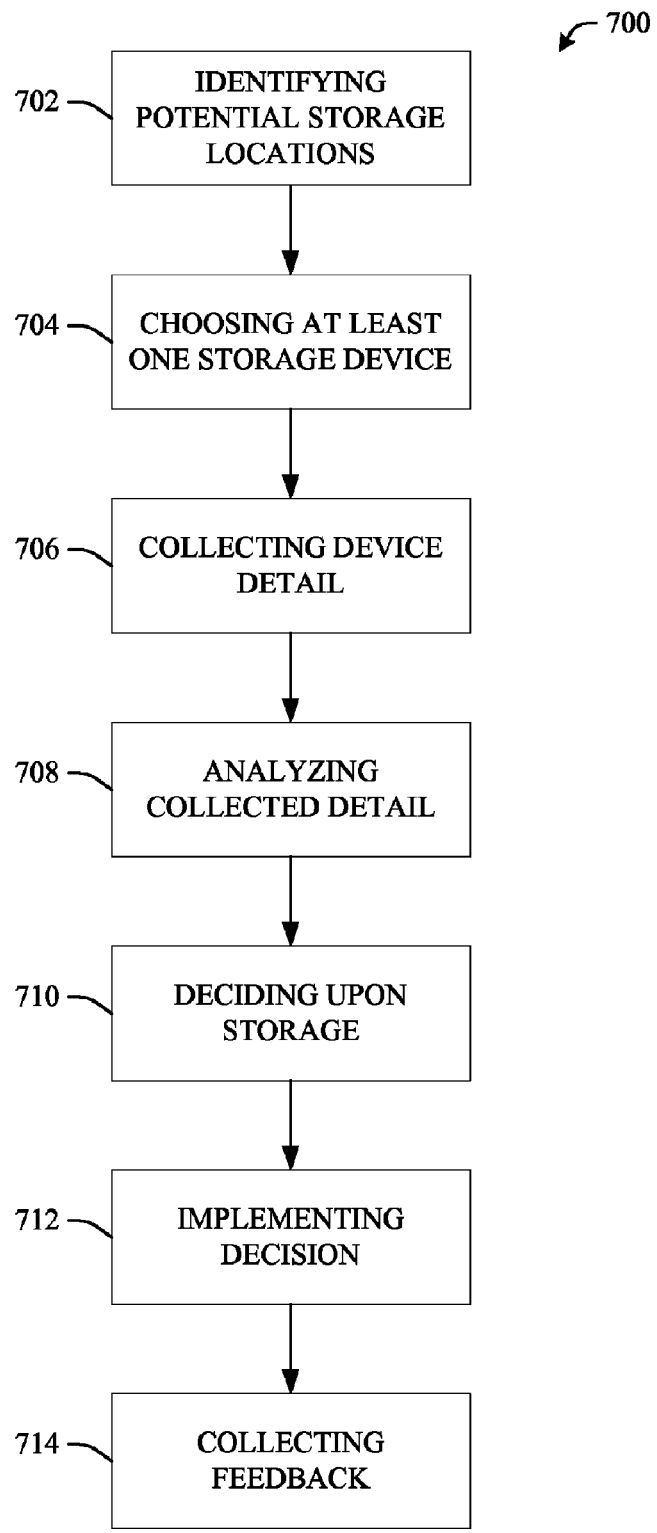
FIG. 7 illustrates a representative methodology for data retention in accordance with an aspect of the subject specification.

Now referring to FIG. 7, an example methodology 700 is disclosed for improving storage of information through appropriate placement among various storage devices. A command to store data can be received and potential storage locations can be searched out and identified through event 702. At block 704, at least one storage device is chosen for further analysis. Commonly, a determination is made based upon a comparison of characteristics associated with the locations.

Details pertaining to the chosen device can be collected through action 706. At least a portion of the collected details can be analyzed through event 708. Based upon a result of the analysis, a storage location can be decided upon at act 710, commonly the decision is based upon use of artificial intelligence techniques. Once a decision is made, feasibility of the selection can occur and be implemented as part of action 712. Once implemented, operation of storage can be monitored and feedback can be collected at action 714. Feedback can be explicit, such as requesting devices to report on operation or passive such as monitoring device performance.

Figure 8:
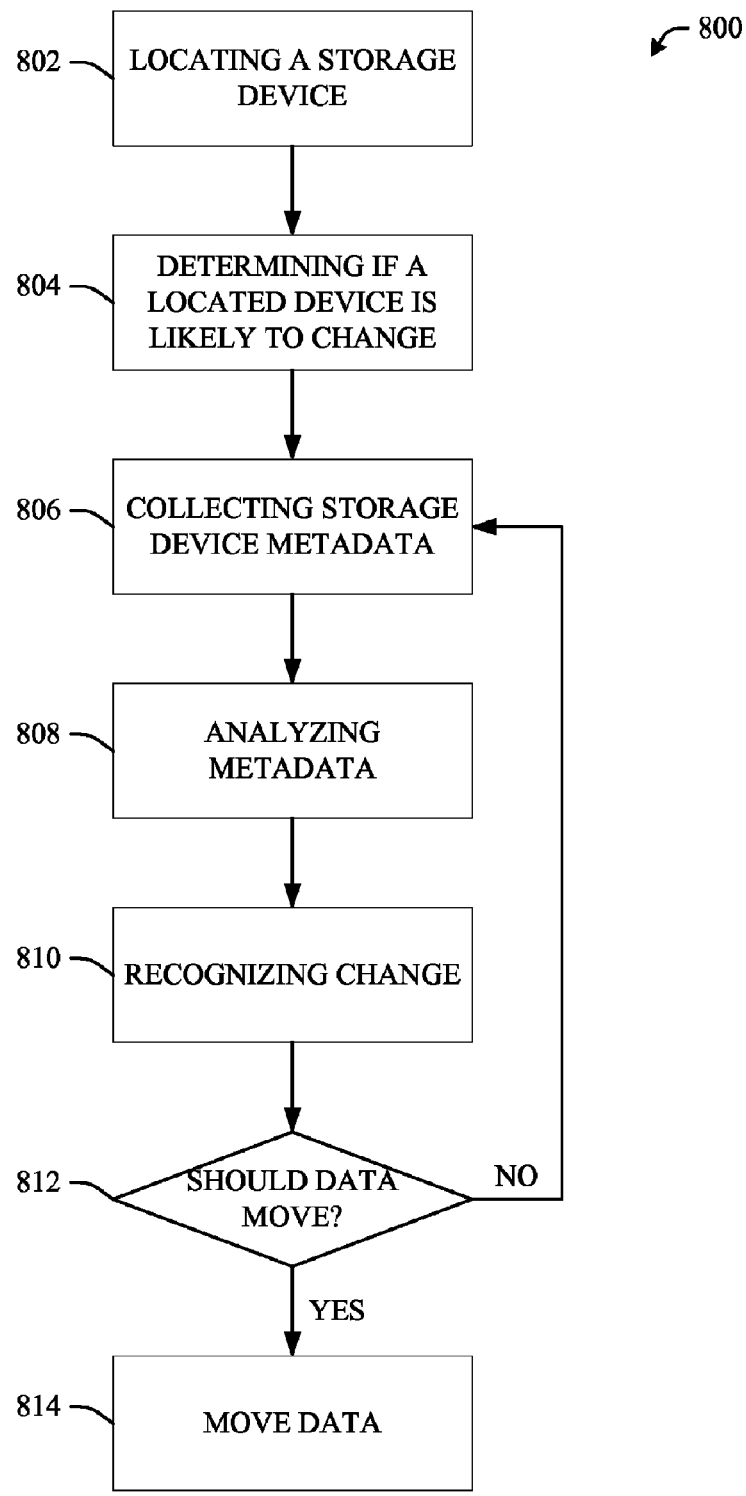
FIG. 8 illustrates a representative methodology for arranging stored information in accordance with an aspect of the subject specification.

Now referring to FIG. 8, an example methodology 800 that can dynamically move information among storage locations. A storage device can be located that is part of a contract at event 802. Specific logic can be used to identify locations that can retain information. For example, a failed flash memory device can be ignored while designating at least two other flash memory devices as potentially useful. Event 802 can implement as locating at least one storage device, the located storage device can ultimately be analyzed and a result of the analysis can be used to determine if there is a likelihood of at least one characteristic change.

Evaluation of the storage device can lead to determining if a located device is likely to change at action 804. Some storage devices can be stagnant and such have a low likelihood of enduring a characteristic change. This action allows for stagnant devices to be ignored in order to save processing time and resources. Action 804 can operate as determining a storage device that is likely to have at least one characteristic change. Example characteristics can include performance, financial cost, wear, load, power consumption, historical usage, at least one association, etc.

Metadata related to the storage device can be collected at event 806. Collection of the metadata can be selective—a certain type of metadata can be gathered such as number of accessed upon data retained on a device as well as metadata related to physical performance. Additionally, a set amount of metadata can be gathered, such as metadata that occupies a temporary memory location. Ultimately, the collected metadata can be used to recognize a change in a storage device.

At block 808, analysis of at least a portion of the metadata can occur. Block 808 can represent analyzing the primary storage device and the supplemental storage device, a result of the analysis can be used in determining if at least one data portion should automatically and intelligently be moved from a primary storage device to a supplemental storage device due to the change in the at least one characteristic A change in the storage device can be recognized as a function of a result of the analysis in act 810. Artificial intelligence techniques can be used to determine if a change takes place. According to one embodiment, historical data can be compared against more recent data to determine if a change occurs. Act 810 can function as recognizing a change in at least one characteristic of a primary storage device.

A check 812 can occur if data should move. Sometimes, a change can be so insignificant that it can be detrimental to waste resources for moving data or the change does not influence operation. The check 812 can implement as determining if at least one data portion should automatically and intelligently be moved from the primary storage device to a supplemental storage device due to the change in the at least one characteristic. If data should not move, then more metadata can be collected at event 806.

If it is determined that the data should move, then appropriate implementation can take place at action 814. Thus, action 814 can operate as moving the data portion if it is determined that the move should occur. The methodology 800 can operate in multiple simultaneous instances, such that different pieces of data are being moved among multiple devices in order to provide an improved (e.g., optimized) storage configuration.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
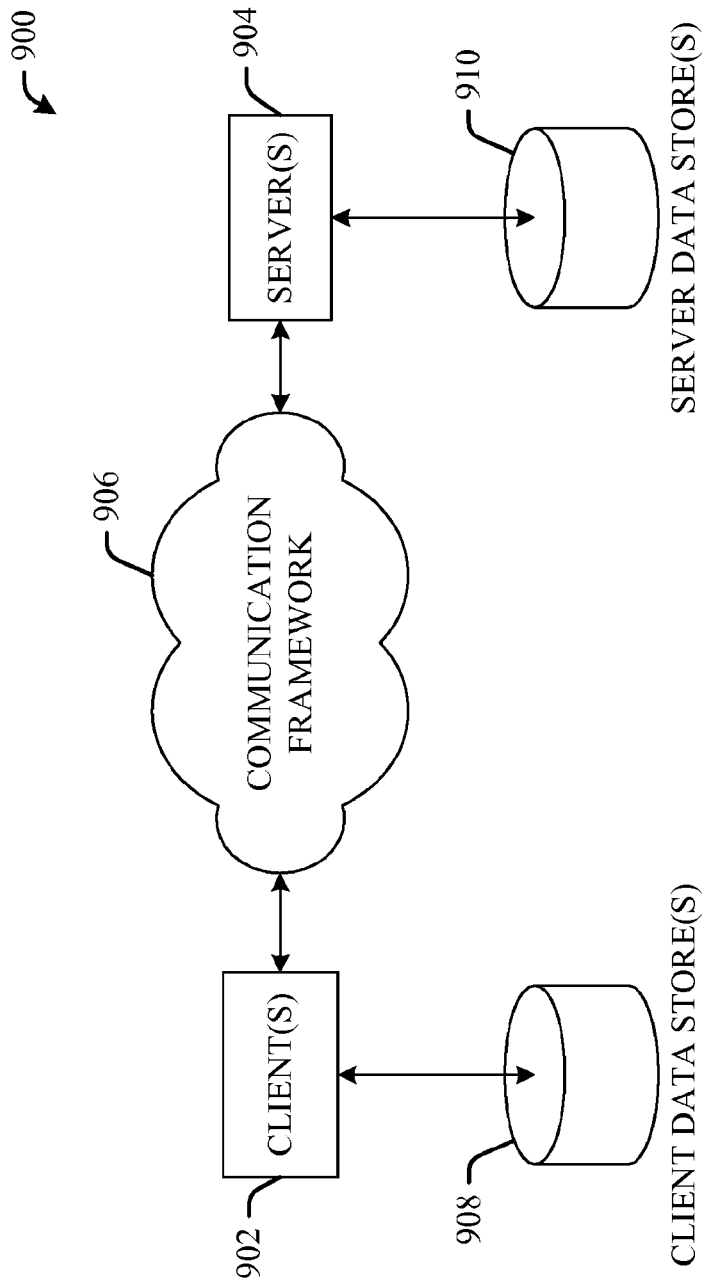
FIG. 9 illustrates an example of a schematic block diagram of a computing environment in accordance with an aspect subject specification.
Figure 10:
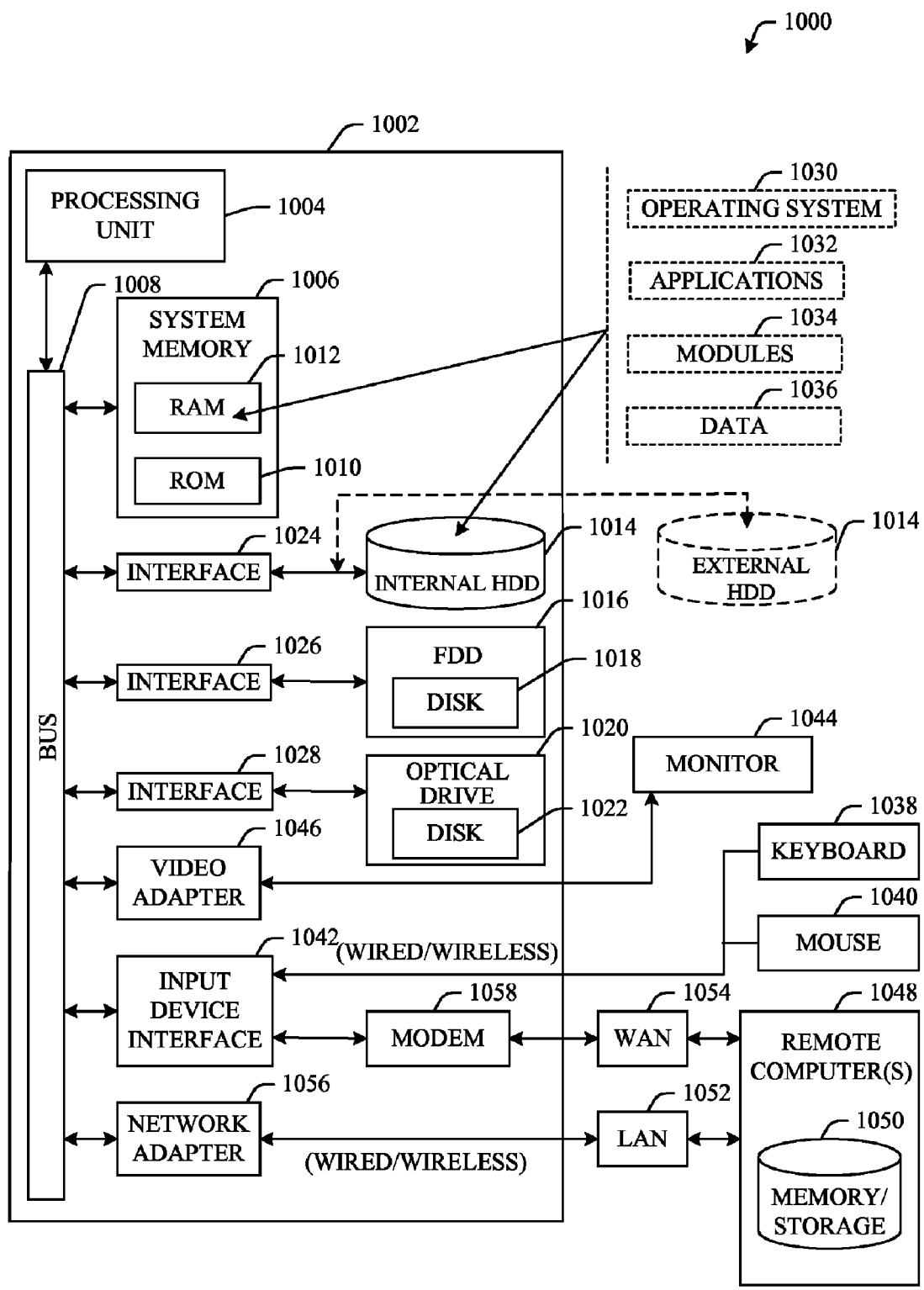
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer or via similar system(s) or device(s).

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a communication component that engages at least one entity;
   a collection component that obtains an instruction to retain data from at least one engaged entity;
   an authentication component that checks a credential of a source of the instruction, generates a report if the credential of the source of the instruction is not authenticated, and transfers the report to an administrator;
   a security component that determines whether the instruction should be performed based upon contents of the instruction, identifies potential damages associated with the instruction, and declines to perform the instruction if there are identified potential damages, the potential damages including retaining malicious contents according to the instruction; and
   a choice component that intelligently selects a memory device to retain the data from a group of at least two memory devices which is facilitated by obtainment of the instruction.

2. The system of claim 1, wherein the multiple factors comprise a memory device performance, a load, a wear, a power consumption, a historical usage, or a data importance.

3. The system of claim 1, further comprising a track component that monitors operation of a memory device that is part of the group of at least two memory devices, gathers data that pertains to operation of a memory device that is part of the group of at least two memory devices, makes an assumption on operation of a memory device that is part of the group of at least two memory devices, or a combination thereof, wherein a result of employment of the track component is used to select the memory device.

4. The system of claim 3, further comprising an initiation component that automatically generates the instruction to retain data as a function of employment of the track component.

5. The system of claim 1, wherein at least two memory devices of the group of at least two memory devices are of different memory types.

6. The system of claim 1, wherein at least two memory devices of the group of at least two memory devices are of different memory formats.

7. The system of claim 1, wherein at least two memory devices of the group of at least two memory devices reside at different physical locations.

8. The system of claim 1, further comprising an analysis component that evaluates the content of the data, content of the data being used to select the memory device.

9. The system of claim 1, further comprising a transfer component that moves previously saved information from a previous memory device to a subsequent memory device.

10. The system of claim 9, wherein the previously saved information is the data designated for retention.

11. The system of claim 9, wherein the previously saved information is separate from the data that moves to facilitate retention of the data.

12. The system of claim 1, further comprising an artificial intelligence component that makes at least one inference or at least one determination in relation to instruction obtainment or memory device selection.

13. A method, comprising:
under control of one or more processors configured with computer-executable instructions:
locating multiple storage devices, the multiple storage devices including a primary storage device and a supplemental storage device, the locating including ignoring a storage device from the multiple storage devices that is failed or stagnant;
determining that there is a chance of a change in at least one characteristic of the primary storage device;
in response to determining that the change is sufficiently low that it is detrimental to waste resources to move data, determining that the data should not be moved from the primary storage device; and
in response to determining that the change is not sufficiently low, automatically and intelligently moving multiple portions of the data simultaneously from the primary storage device to the supplemental storage device due to the change in the at least one characteristic.

14. The method of claim 13, further comprising:
analyzing the primary storage device and the supplemental storage device; and
using a result of the analyzing to determine if at least one data portion should automatically and intelligently be moved from the primary storage device to a supplemental storage device due to the change in the at least one characteristic.

15. The method of claim 14, further comprising:
collecting metadata related to the primary storage device; and
using at least a portion of the collected metadata to recognize the change.

16. The method of claim 15, further comprising storing the metadata at a temporary memory location.

17. The method of claim 13, further comprising moving the data portion if it is determined that the move should occur.

18. The method of claim 13, wherein the at least one characteristic comprise a performance, a load, a wear, a power consumption, a historical usage, or a data importance.

19. The method of claim 13, wherein the at least one characteristic comprise a performance, a load, a wear, a power consumption, a historical usage, or a data importance.

20. A system, comprising:
a processor; and
one or more memories having stored thereon computer-executable instructions that are executable by the processor to perform actions comprising:
gathering an instruction to store information within a specified construct;
identifying at least two memory units within the construct capable of storing the information associated with the instruction;
obtaining metadata concerning at least two of the identified memory units;
analyzing at least a portion of the collected metadata as a function of at least two of the identified memory units suitability to store the information;
automatically and intelligently making a selection of one of the identified memory units for retaining the information as a function of a result of the analysis by considering multiple factors comprising a financial cost;
verifying whether an implementation of the selection achieves a desired result;
in an event that the desired result is not achieved, determining whether a modification should occur; and
in response to a determination that the modification should occur, implementing the selection by storing the information upon the selected memory unit.

21. The system of claim 20, wherein the at least two memory units of the construct are of different memory formats and the at least two memory units of the construct are at different physical locations.

* * * * *